(12) United States Patent
Nakabe et al.

(10) Patent No.: US 7,284,132 B2
(45) Date of Patent: Oct. 16, 2007

(54) MEMORY CARD

(75) Inventors: Futoshi Nakabe, Hiroshima (JP);
Tadakatsu Masaki, Hiroshima (JP);
Shinji Kawano, Hiroshima (JP); Hideo Oozeki, Hiroshima (JP); Hiromi Ebara, Hiroshima (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 869 days.

(21) Appl. No.: 10/350,018

(22) Filed: Jan. 24, 2003

(65) Prior Publication Data

US 2003/0137887 A1 Jul. 24, 2003

(30) Foreign Application Priority Data

Jan. 24, 2002 (JP) ............................. 2002-015008

(51) Int. Cl.
*H04K 1/00* (2006.01)
*G06F 11/30* (2006.01)
*G06F 7/04* (2006.01)
*H04L 9/32* (2006.01)
*G06K 19/07* (2006.01)
*G06K 17/00* (2006.01)
*G06K 19/02* (2006.01)
*G06F 12/16* (2006.01)
*G11C 5/00* (2006.01)

(52) U.S. Cl. .......................... 713/182; 713/193; 726/2; 726/5; 726/9

(58) Field of Classification Search ............... 713/182, 713/193; 726/2, 9, 5
See application file for complete search history.

(56) References Cited

U.S. PATENT DOCUMENTS 5,715,431 A * 2/1998 Everett et al. .............. 711/156
2004/0006654 A1 * 1/2004 Bando .......................... 710/1

FOREIGN PATENT DOCUMENTS

| EP | 1 047 016 A | 10/2000 |
| EP | 1 050 887 A | 11/2000 |
| EP | 1 081 616 A | 3/2001 |
| EP | 1560120 A1 * | 8/2005 |
| JP | 2000-099676 | 4/2000 |
| WO | WO 87 07061 A | 11/1987 |

OTHER PUBLICATIONS

T. Kato et al., "A Secure Flash Card Solution for Remote Access for Mobile Workforce", IEEE Transactions on Consumer Electronics, vol. 49, Issue 3, Aug. 2003, pp. 561-566.*

* cited by examiner

*Primary Examiner*—Matthew Smithers
*Assistant Examiner*—Courtney D Fields
(74) *Attorney, Agent, or Firm*—McDermott Will & Emery LLP (57) ABSTRACT

The memory card with a simple configuration is provided with more reliable security. When the memory card receives the access request to the memory from the external connecting device, the access unit accesses the memory based on the access request. At this time, the switch composing the memory card indicates the propriety of the access right to the memory, and the access limitation unit limits that the access unit accesses the memory.

11 Claims, 5 Drawing Sheets

MEMORY CARD

BACKGROUND OF THE INVENTION

1. Field of the Invention

This invention relates to a memory card, and more specifically, this invention relates to the memory card that is provided with a security function.

2. Description of the Related Art

Recently, for instance, it is remarkable that a memory card comprising a nonvolatile memory has got to be downsized and provided with large memory size; therefore it raises the expectations that the available fields of such memory card will be expanded As well as the downsizing of the memory card makes the card available to set to many devices, due to the large memory size the card can be applied to the device having mass data to be stored. If the memory card comprises the common specification, a plurality of devices can use the memory card.

Additionally, diversified changes come out with the devices to which the memory card will be applicable. That is to say, one is that the control of each device becomes be in common by using the language, such as JAVA and the like; those languages independent of any hardware. And another is that the network connection makes it possible to carry out the remote control operation and the information sharing.

And now, one of the prior arts for protecting the writing into the memory card is disclosed in Japanese Laid-open Publication No. 2000-99676. The prior art disclosed teaches that the memory card is provided with a switch to set the prohibition of writing data into the memory card, and in response to a request (query) from a control device (host computer) a control unit provided with the memory card transmits a setting conditions of the switch to the control device.

The above-mentioned related art is arranged so that the control device can execute the prohibition processing of the data writing according to the setting conditions of the switch.

As mentioned above, it raises expectations that the available fields of the memory card will be expanded due to the downsizing with large memory size, however, the card requires the security in order to promote the application of the card in various fields. In particular, in order to use the memory card to store information to be handled with care, such as private information and information for the e-commerce, the memory card must be provided with the reliable security. When the user uses a device in order to access the memory card, the use is not always in good faith. Therefore the security must be ensured also in the memory card instead of assuring only the security by the cooperation between the device and the memory card.

However, the prior art disclosed in the above Japanese Laid-open Publication No. 2000-99676 is to prevent the data from being deleted inadvertently by a user, and the memory card itself is not provided with the security.

In other words, the memory card disclosed in Japanese Laid-open publication No. 2000-99676 only informs the control device, like the mobile phone, of the information that the switch is on or off. Accordingly, in case where the control device is controlled maliciously, it is possible to write data into the memory card regardless of the information of the switch-on or switch-off, or without confirming the switch-on or switch-off. In addition, since the switch does not function at all regarding the reading data stored in the memory card, the data can be read without difficulty. It is the same with the floppy disk (R) that is used heretofore generally.

And, for instance, the data stored in the memory card has seemed to be safe before now, except the memory card is stolen and the data therein is read by any ill-disposed person.

However, it is apt to adopt the language without appointing the platform in these days, so that it is possible to let the (control) device execute the malicious program adopting such language. Moreover, it is apt to use devices connecting each other with the network, so that the malicious program can be downloaded to the (control) device in one way or another, and executed by the device. And the malicious program thus executed reads the data from the memory card, and the read data can be transmitted through the network. As a practical matter, there are many reports that some computer viruses work the same operation. Particularly, in case of accessing the memory card via wireless communication like the contactless IC card, there is a possibility that the memory card is accessed by any third party while the user is not aware of it.

Under such conditions, in spite of that the user carries the memory card in his hand, there is a lot of possibility that the data stored in the memory card is read out or tampered while the user is not conscious of it.

SUMMARY OF THE INVENTION

The present invention is proposed based on the above conventional conditions, and has an object to provide the memory card comprising more reliable security according to a simple configuration.

The invention adopts the following unit in order to achieve the above object. That is to say, the invention presupposes the memory card that receives an access request to memory unit sent from an external connecting device, and accesses the memory unit based on the access request by means of access unit. In the memory card, a switch composing the memory card indicates the propriety of access to the memory card. And access limitation unit limits accesses to the memory unit from the access unit based on the condition of the switch.

The memory card itself judges the condition of the switch and then limits the access to the memory unit as above, with the result that the access can be limited without fail based on the condition of the switch regardless of the external connecting device even when the external connecting device accesses the memory unit maliciously, for example.

Additionally, in case where the memory unit is provided with an area requiring the authentication and an area not requiring the authentication, the access limitation unit may limit accesses to the area requiring the authentication from the access unit based on the condition of the switch.

Moreover, the access unit may perform the authentication to access the area requiring the authentication and then accesses the area requiring the authentication based on the result of the authentication.

Furthermore, in case where the memory unit is provided with an area used for the electronic commerce, the access unit judges whether the access request is concerned with the electronic commerce or not. If the access request is concerned with the electronic commerce, the access unit accesses the area used for the electronic commerce. In this case, the access limitation unit may limit the access to the area used for the electronic commerce.

The access limitation can be given in adequate manner under the above configuration, so that it is possible to limit the access to individual memory areas, such as the accesses to the area requiring the authentication and the area not requiring the authentication, or the accesses to the areas concerned with the electronic commerce and the unconcerned area. Therefore, the secure memory unit can be distinguished from the general purpose memory unit by the configuration that the access to the secure memory unit is prohibited without fail while the general purpose memory unit is available. In result the user can acquire the information security without detracting from the facilities of the memory card. Besides, the memory unit predetermined to be used for the electronic commerce can be the memory unit provided within TRM (Tamper Resist Module).

The access to the memory unit may be to read data from the memory unit, or to write data into the memory unit.

In case where the switch is a physical switch and the insert part is inserted to a specific slot of the external connecting device at the access to the memory card, the switch may be provided to the insert part.

Under such configuration, since the switch cannot be operated before pulling the memory card out of the external connecting device, the inadvertent operation of the switch (ON or OFF) can be avoided.

The switch may be provided to the non-insert part.

Under such configuration, the switch can be operated without pulling the memory card out of the external connecting device, and this makes it possible to operate the switch freely.

Moreover, while detecting the condition of the switch, the access limitation unit may store the detected condition in the memory unit and prohibit the access unit from accessing to the memory unit based on the change of condition.

Under such configuration, when the memory card with the switch turned off is lost, turning the switch only does not make it possible to access the memory unit. Therefore the access limitation (security) can be expected even when the memory card is lost.

The method for releases the prohibition of access is arranged so that the access limitation unit asks a password from the external connecting device and the prohibition of the access is released based on both the password inputted from the external connecting device and prestored password inside.

Under such configuration, the password is asked only when the condition of the switch is changed. Therefore, in case where the electronic commerce is performed many times continuously, it is possible to save the user's operation of inputting the password continuously.

DESCRIPTION OF THE PREFERRED EMBODIMENTS

The following discusses preferred embodiments of the present invention with reference to the attached drawings, which is provided for the understanding of the present invention. Besides, the following embodiments are examples in which the invention is carried out, and do not limit the technical scope of the invention.

Embodiment 1

Figure 1:
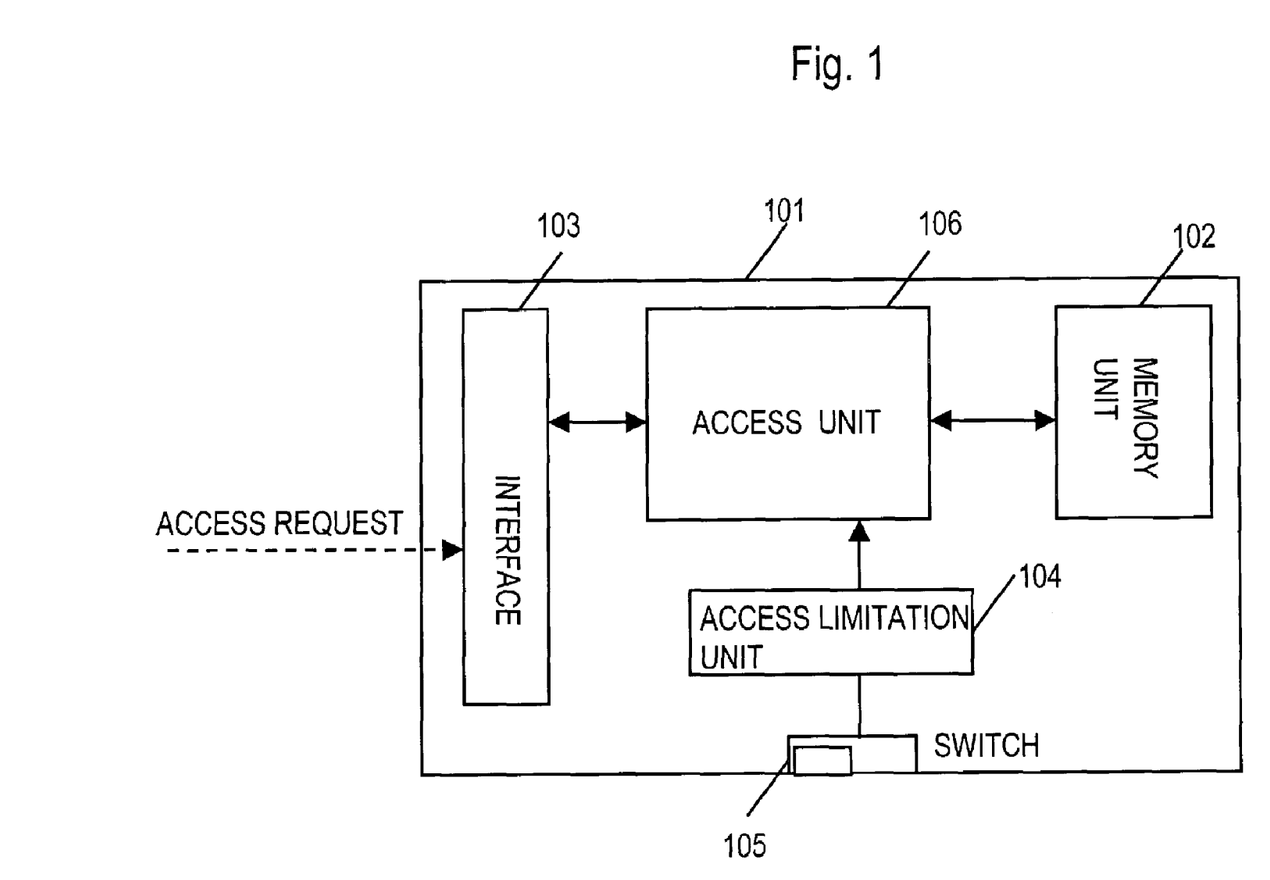
FIG. 1 is a schematic functional block diagram showing the memory card in the embodiment 1.
Figure 2A:
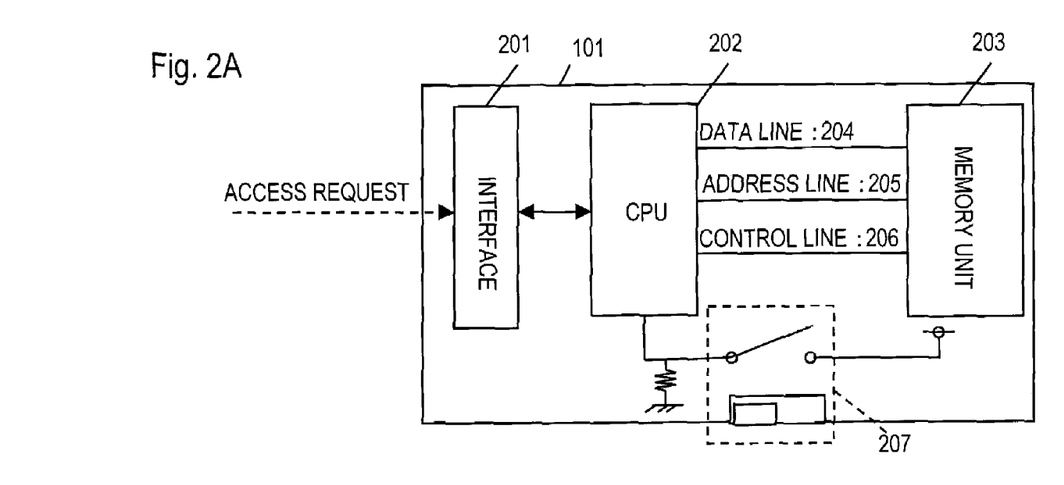
FIG. 2A and 2B are outline diagrams showing the hardware of the memory card in the embodiment 1.
Figure 2B:
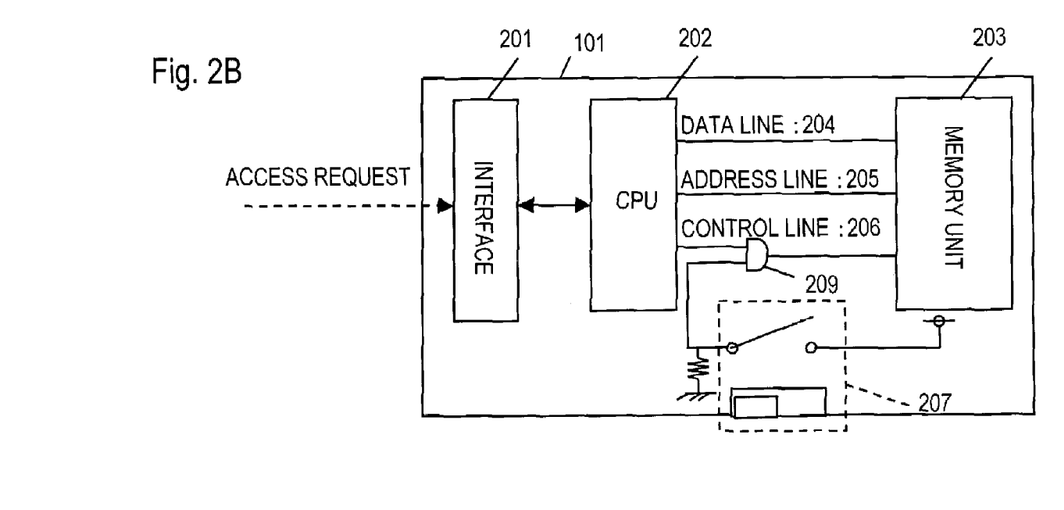
Figure 3:
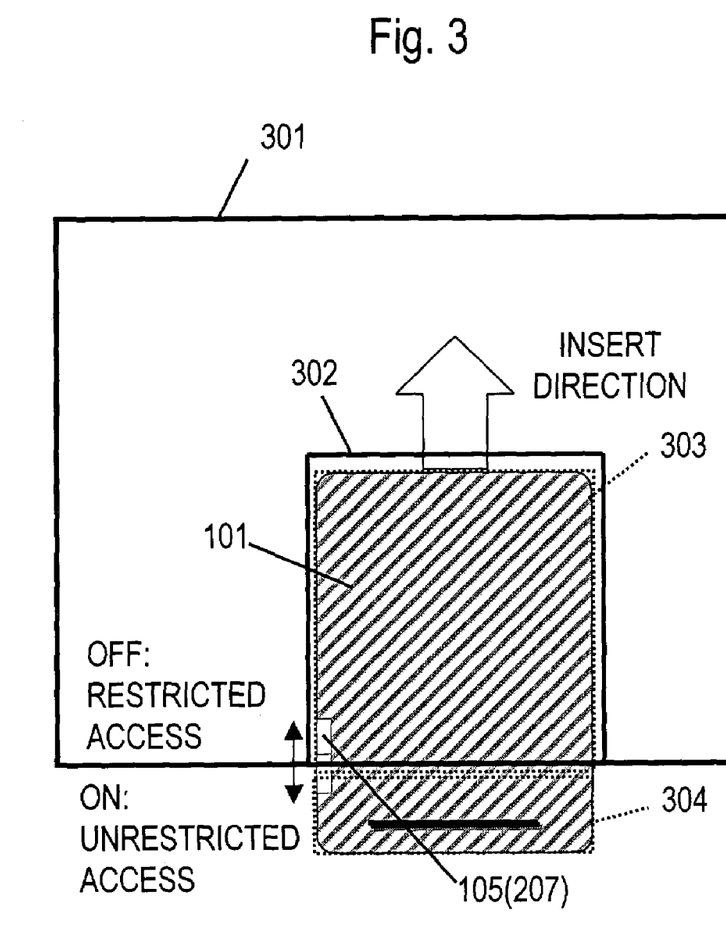
FIG. 3 is an image diagram when the memory card is inserted into the external connecting device.

FIG. 1 is a schematic functional block diagram showing the memory card of the present invention in the embodiment 1, FIG. 2 is an outline diagram showing the hardware of the memory card, and FIG. 3 is an image diagram when the memory card is inserted into an external connecting device.

Memory card 101 has a laminar shape with a thickness of about 2 mm in stamp size, for example. External connecting device 301 can use the memory card 101 inserting or installing the card into the external connecting device 301. Besides, the external connecting device 301 is a mobile phone, for example, and it is taken as an example that a user, connects the mobile phone with a specific website for the electronic commerce utilizing the communication function of the mobile phone, and then executes the transaction. In such example, the mobile phone is to perform the transaction by using various information such as the electronic money and etc. stored in memory unit 102 of the memory card.

At the time of using the memory card 101, insert part 303 of the memory card is installed in slot 302 of the external connecting device 301, and thereby interface 103 (304 in FIG. 3) of the memory card is connected with the built-in interface (not shown in the drawing) of external connecting device 301 so as to communicate mutually.

After the interface 103 of the memory card 101 is connected with the built-in interface of external connecting device 301, the external connecting device 301 can transmit an access request and data to the memory card 101 via the interface 103. If the memory card 101 itself has no power, the power can be supplied to the card if necessary. The memory card 101 is provided with physical switch 105 that the user can slide by his finger, for example, and it is arranged so that the user can turn the switch 105 "on" or "off" arbitrarily, of which details will be explained later.

According to FIG. 2A, the configuration of hardware of the memory card 101 will be explained hereinafter. Besides, in order to understand the invention, the explanation is made only regarding parts relevant to the invention except unnecessary parts.

The memory card 101 is provided with interface 201 as hardware, and the interface 201 is connected with CPU (Central Processing Unit) 202. The CPU 202 is connected with memory unit 203 composed of a nonvolatile memory and the like via three lines, for example. Those three lines are data line 204, address line 205 and control line 206. The data line 204 is to transmit and receive data to be read from or written into memory unit 203 at the writing or the reading. Address line 205 is to transmit an address on the memory unit storing an object data to be written or read at the reading or the writing. Control line 206 is to transmit a request to memory unit 203, such as a writing request or a reading request. Additionally, a line directly working with switch 207 is inputted to the CPU 202. When switch 207 is turned on, a specific voltage (3.3V, for example) is inputted to the CPU 202. Besides, under such configuration, the CPU 202 corresponds to access unit 106, switch 207 corresponds to a switch and access limitation unit shown in FIG. 1.

Subsequently, the accessing to the memory unit 102 from the external connecting device 301 is explained hereunder. For instance, when the external connecting device 301 reads the data stored in the memory unit 102, the external connecting device 301 transmits the reading request to access unit 106 of the memory card 101 via the interface 103.

Access unit 106, which received the reading request, judges the condition of the switch 105 through access limitation unit 104 before reading a specified data from the memory unit 102(203).

At this time, if the condition of the switch 105(207) is "on", for example, it means that the access to the memory unit 102(203) is permitted. In result, the access unit 106 reads the data to be an object from the memory unit 102(203) and then transmits the data to the external connecting device 301 through the interface 103(201). The condition of the switch 105(207) can be judged from that the voltage of the specific line of the CPU 202 turns to a high level when the condition is "on", for example. Besides, the access unit 106 is a program executed by the CPU 202 under such configuration, for example, and the access limitation unit 104 is provided as a specific line inputted in the CPU 202 and as a program for judging voltage of the line. And the switch 105 is composed of hardware, that is, a physical switch.

As described above, the memory card itself judges the condition of the switch and limits the access to the memory unit, therefore the access can be limited without fail not depending on the external connecting device but based on the condition of the switch even if the external connecting device tries to access the memory unit with malicious. Thus configured access limitation can prevent the malicious access from the external side using the network function; those accesses are increasing in these days. Additionally, since the switch is configured so as to be "on" or "off" physically, it is possible to prevent, without removing the memory card, the situation that the data stored in the memory card is read out while he is not conscious of it. Therefore, the sense of security can provide to the user as well as the facilities are improved.

In the above description, the request from the external connecting device 301 is the reading request, and likewise it is possible to prevent the writing request using the switch. In addition to the conventional prevention function for the writing caused by the user's inadvertent operation, such configuration makes it possible to prevent the operation that the data stored in the memory unit is tampered from the external side.

And the memory card in the invention may be arranged as shown in FIG. 2B in addition to the configuration shown in FIG. 2A. That is to say, switch 207 is connected with AND circuit 209 connected with control line 206, for example. Under such configuration, only when the switch is "on", the control signal from the CPU 202 is transmitted to memory unit 203. Accordingly, there is the same effect as well as in FIG. 2A. Additionally, since the program is not concerned with the judgment of the condition of switch 207, even if any malicious third party tampers with the program in the memory card via the network and the like, the same access to the memory unit can be limited without fail. It is needless to say that it is possible to limit the same access to the memory unit without fail in case of the wireless communication used by the contactless IC card. Moreover, it is also possible to limit the access to the memory unit without fail in case of the IC card (Combination IC card) with contact/contactless IF. Besides, under this configuration, AND circuit 209 composes access limitation unit 104, but there is no need for limiting the circuit to AND circuit, and it may be the one that can physically limit the access to the memory unit 104.

Moreover, if it is arranged that insert part 303 of the memory card 101 be provided with the switch 105, the switch cannot be operated after the memory card is pulled out of the external connecting device 301. Therefore, it is possible to prevent the inadvertent operation of switch (on or off).

Furthermore, if the switch 105 is provided to the other position except the insert part 303 of the memory card 101, that is, non-insert part 304, the switch can be operated without pulling the memory card out of the external connecting device 301. Therefore, this configuration makes it possible to operate the switch at any time.

Embodiment 2

Figure 4:
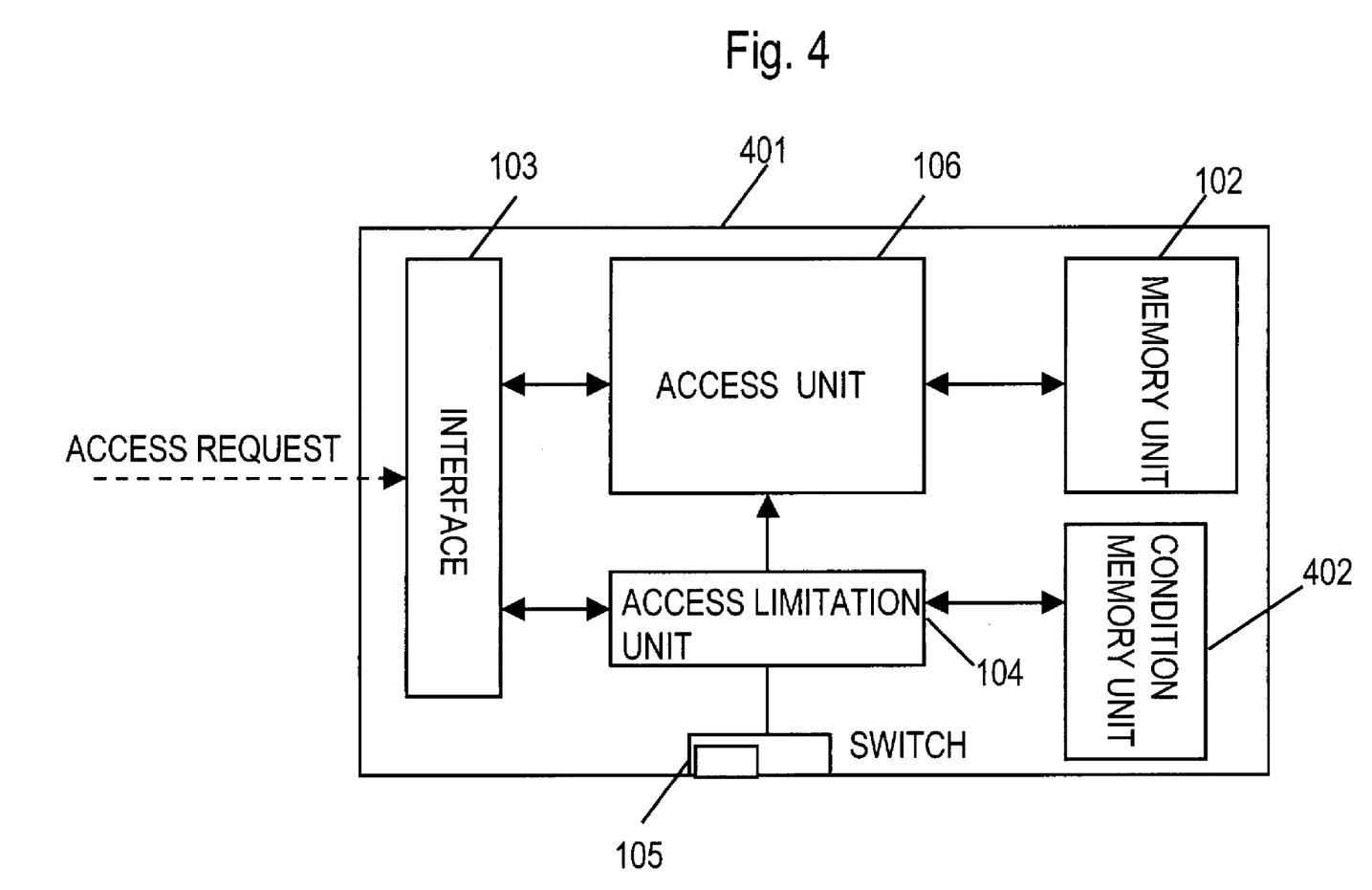
FIG. 4 is a schematic functional block diagram showing the memory card in the embodiment 2.

The following description relates to the memory card provided with a system detecting the change of the conditions of the switch. FIG. 4 is a schematic functional block diagram showing the memory card in the embodiment 2, of which configuration is discussed here only regarding the different points from the above.

The memory card in this embodiment 2 is provided with condition memory unit 402 in addition to the configuration of the memory card 101.

In other words, for example, when the power is distributed to the memory card which is connected with the external connecting device, or when the condition of the switch 105 is changed, the access limitation unit 104 composing memory card 401 detects the changed condition of the switch 105 through the access limitation unit 104 and stores the detected result in memory unit 402. Besides, since the condition memory unit 402 is composed of the nonvolatile memory, the stored memory can be retained in the memory even when the power is not distributed to the memory card.

Subsequently, after the access limitation unit 104 detects once again the condition of the switch at a specific time, the detected result is compared with the previous condition of the switch that is stored in the condition memory unit 402. At this time, if the previous condition of the switch is different from this detected condition, the changed condition of the switch is stored in the condition memory unit 402. Additionally, if the condition of the switch is changed from the "limited" access to the "unlimited" access, the access limitation unit 104 transmits to the external connecting device a request asking the user to input password via the interface 103.

Against the request asking the user to input the password, the external connecting device 301 receives the password from the user according to the predetermined procedure and then notifies the password to the access limitation unit 104 via the interface 103.

The access limitation unit 104 that has received the password compares the received password and the password pre-stored in the memory unit 102. If the received password is identical with the pre-stored password, the access limitation unit 104 informs the access unit 106 of the result.

The access unit 106, which received the message to the effect that the password is identical with the pre-stored one, can access the memory unit 102.

As described above, it is arranged in the invention that the change of the condition of the switch is detected and then the propriety of access is determined based on the change. In result, even if the user has lost the memory card wherein the switch is kept "off", any person cannot access the memory unit only by turning the switch "on" Accordingly, it is possible to keep the access limitation (security) in case of losing the memory card. Unlike with the general case that the password is asked, the password is asked only when the condition of the switch is changed. Therefore, in case where the user performs the electronic commerce a number of times continuously, it is possible to save a trouble that the user must input password continuously.

Besides, if the unique number of the external connecting device 301 is stored in the access limitation unit 104, it is possible to ask the user the password as well as when the unique number is changed.

Embodiment 3

Next, here is explained another memory card provided with a further complicated configuration. It raises expectations in these days that the memory card will be expanded to available fields, which was described in the previous paragraph. For this reason, in order to expand many available fields the memory card is requested to store diversified information.

For instance, the diversified information is as follows:
i) Information that is not controversial even if leaked out,
ii) Information, such as copyright contents and etc., that is not always controversial immediately even if leaked out, and
iii) Information, such as the credit card number, the electronic money for the electronic commerce, and etc., that has to be prevented from the leaking or the tampering by no means.

Meanwhile, there are occasions when the problem arises in case where the above all information are handled in the same manner. That is to say, when the "information that is not controversial even if leaked out" is stored, the security level is made high, that is, the authentication and encryption are performed. In result, it occurs as a harmful influence that the user is required to input further information and the storing speed gets slow down. This detracts the user's facilities meaninglessly. In addition, in case of needlessly raising the security level of the streaming contents such as the music, for example, the complicated decoding is required every time the content is reproduced. Accordingly, it occurs that such decoding is not in time for the content reproducing. Additionally, since the high performance of CPU is required, the cost of the memory card increases. And the complicated processing increases the consumption power, which puts the disadvantage upon the utilization of the mobile terminal.

On the other hand, when the "information that has to be prevented from the leaking or the tampering by no means" is stored, the security level is made high, that is, the sufficient authentication and encryption must be performed.

In order to store the diversified types of information in one memory card, there is the multifunctional memory card comprising a plurality of memory areas within the memory card. In such memory card, a plurality of memory areas with different security levels are appropriately used corresponding to the information to be stored, so that the facilities and the tamper resist can be provided to the memory card.

However, a problem comes out when the access limitation unit described in the embodiment 1 is applied to such memory card with a plurality of memory areas. For instance, the switch turns "on" or "off" in order not to allow to read the "information that has to prevent from the leaking or the tampering by no means" through the wireless communication while the user is not conscious of it, with the result that the other information such as the music content becomes unavailable for the user. Under such configuration, the user has lost the facilities in turn for the security of information.

Therefore, the embodiment 3 explains the method to adapt the invention for the multifunctional memory card.

Figure 5:
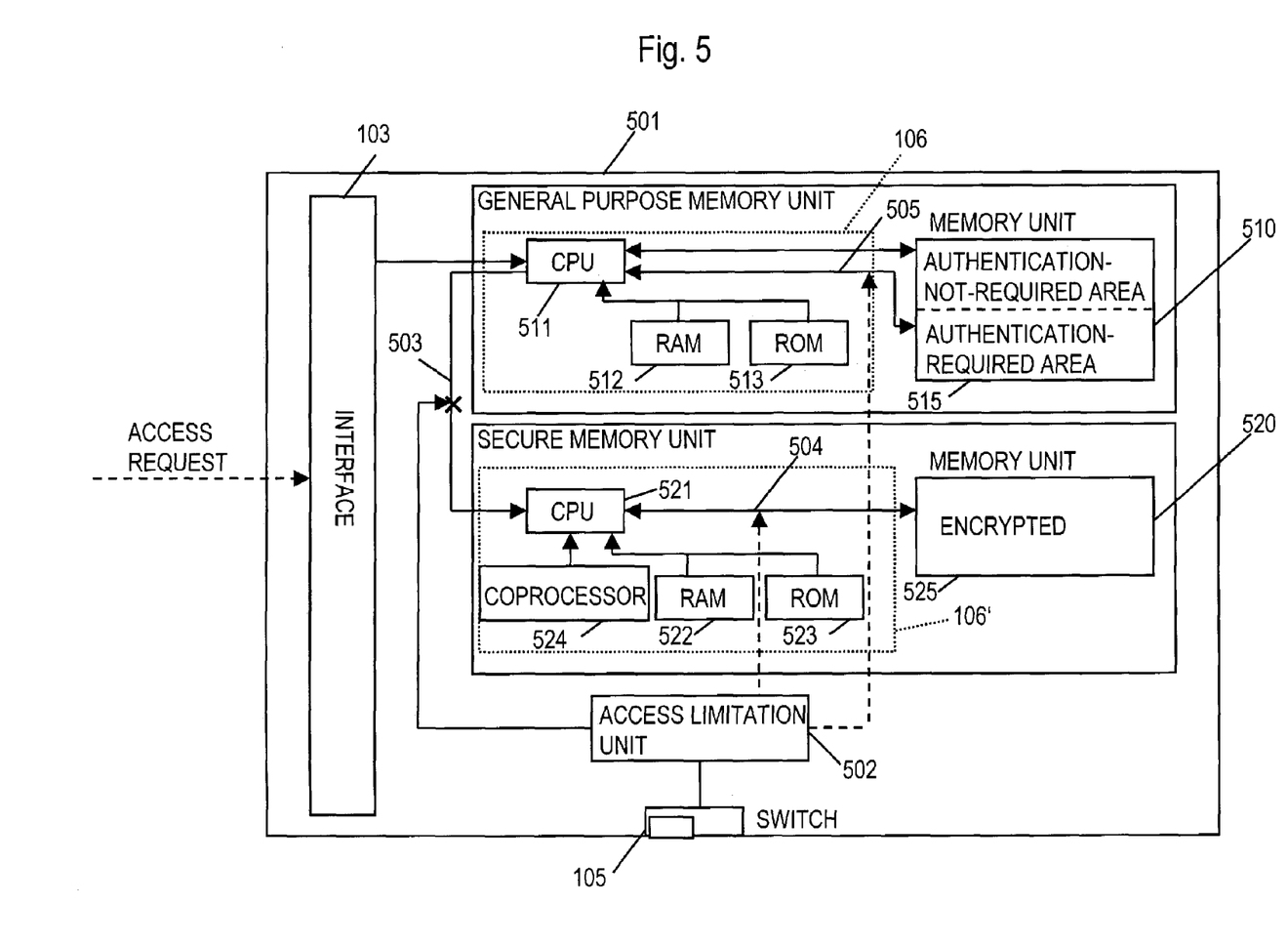
FIG. 5 is a schematic functional block diagram showing the memory card in the embodiment 3.

Memory card 501 in the embodiment 3 comprises the interface 103, general purpose memory unit 510, secure memory unit 520 and further comprises the access limitation unit 104 and the switch 105.

The general purpose memory unit 510 is provided with CPU 511, RAM 512, and ROM 513; those composing the access unit 106 and further provided with memory unit 515. The CPU 511 interprets the access request to the memory unit 515 received via the interface 103, and then accesses the memory unit 102 if necessary. Besides, CPU 511 performs the after-mentioned processing by means of the program read from the RAM 512 or the ROM 513, but the detailed explanation will be made as the occasion may demand.

The secure memory unit 520 is provided with CPU 521, RAM 522, ROM 523 and co-processor 524; those composing the access unit 106', and further provided with memory unit 525. The CPU 521 interprets the access request to the memory unit 525 received from the CPU 511, and then accesses the memory unit 102 if necessary. Besides, the CPU 521 performs after-mentioned processing by means of the program read from RAM 512 or ROM 513, but the detailed explanation will be made as the occasion may demand.

The memory unit 515 of the general purpose memory unit 510 is composed of both an authentication-not-required area and an authentication-required area, for example. The CPU 511 does not limit any access to the authentication-not-required area. That is to say, for instance, when the reading request designating an address on the authentication-not-required area is received via the interface 103, The CPU 511 reads the data corresponding to the specified address unconditionally and then transmits the data via the interface 103. On the contrary, regarding the access to the authentication-required area, the CPU 511 asks the password, for example, from the external terminal that has transmitted the access request. If there is no problem in the authentication based on the password, the CPU 511 accesses the authentication-required area.

At this time, for instance, it is in the authentication-not-required area that stores the "information that is not controversial even if leaked out", while it is in the authentication-required area that stores the "information that has to be prevented from the leaking or the tampering by no means".

Besides, the CPU 511, which received the access request to the memory unit 525 composing the secure memory unit 520, performs the communication with the CPU 521 while keeping the high security based on the secure message, for example. On the basis of the judgment whether the request is the one for the electronic commerce or not, it is decided that the access request is the one to the memory unit 525 or not. If the request is for the electronic commerce, the access to the memory unit 525 is automatically performed based on the judgment of the CPU 511 or CPU 521.

The memory unit 525 on the secure memory unit 520 stores the "information that has to be prevented from the leaking or the tampering by no means", for example. Here, the CPU 521 accesses the memory unit 525 based on the received access request to the memory unit 525 received from the CPU 511. Besides, the authentication for the access to the memory unit 525 is more complicated than that to the authentication-required area. The information stored in the memory unit 525 are encrypted all, and its security is kept in higher than ever. The information stored in the memory unit 525 are decrypted by the co-processor 524, and then transmitted to the external connecting device via the interface 103.

In the memory card thus configured, the access limitation unit 502 may intercept the connection line between the CPU 511 and the CPU 521. According to such operation, though the general purpose memory unit 510 is available, the access to the secure memory unit 520 can be prevented without fail. In other words, the user can acquire the security of the information without detracting the facilities of the memory card. As a matter of course, the secure memory unit 520 may be put out of the function by the method shown in FIG. 2A. Otherwise, the connection line 504 is intercepted by the method shown in FIG. 2B so that the access to the memory unit 525 may be invalidated.

The above-described method is to limit the access to the memory unit 525 of the secure memory unit 520, but the method of intercepting the connection line between the authentication-required area composing the memory unit 515 and the CPU 511 may limit the access to the authentication-required area.

Besides, there is a case where a part of secure memory unit is provided as TRM (Tamper Resist Module) to the inside of the memory card. In addition, the secure memory unit is provided with the TRM with the higher security level and a general secure memory unit in large memory size with the security level not higher than the TRM, and those memories are used appropriately on demand.

As described above, the memory card itself judges the condition of the switch, and then the memory card itself limits the access to the memory unit. In result, even when the external connecting device accesses the memory unit maliciously, it is possible to limit the access without fail based on the condition of the switch regardless of the external connecting device. Therefore, it makes it possible to be sure to prevent the access from the external side using the network function, such access increasing in these days.

Additionally, it is arranged so that the user can turn the switch "on" or "off" physically, and base on such arrangement it is possible to avoid the accident that the data stored in the memory card is read out while the user is not aware it, without removing the memory card. Therefore, it is possible to improve the facilities and give a sense of security to the user.

Moreover, since it is arranged so as to detect the change of the condition of the switch and determine the propriety of the access based on the detected change, it is possible to institute the access limitation (security) in case of missing the memory card. And unlike with the general case that the password is asked, the password is asked only when the condition of switch is changed. Therefore, in case where the electronic commerce is performed many times continuously, for example, it is possible to save the user's operation of inputting the password continuously.

Furthermore, since the appropriate connection line is intercepted physically, it is possible to exactly prevent the access to the secure memory unit while the general purpose memory unit is kept available. Therefore, the user can acquire the security of the information without detracting the facility of the memory card.

What is claimed is:

1. A memory card receiving an access request to a memory unit sent from an external connecting device, and accessing the memory unit based on the access request by means of an access unit, comprising:

an area requiring the authentication for access and an area not requiring the authentication for access being provided to the memory unit;

a switch indicating the propriety of access to the memory unit; and an access limitation unit operable to limit accesses to the area requiring the authentication for access in the memory unit from the access unit based on the condition of the switch.

2. The memory card according to claim 1, wherein the access unit performs the authentication for access to the area requiring the authentication and accesses the area requiring the authentication based on the result of the authentication, and the access limitation unit limits the access to the area requiring the authentication.

3. The memory card according to claim 1, wherein the access to the memory unit is to read data from the memory unit.

4. The memory card according to claim 1, wherein the access to the memory unit is to write data into the memory unit.

5. A memory card receiving an access request to a memory unit sent from an external connecting device, and accessing the memory unit based on the access request by means of an access unit, comprising:

an area used for electronic commerce being provided to the memory unit;

a switch indicating the propriety of access to the memory unit; and an access limitation unit operable to limit accesses to the area used for electronic commerce based on the condition of the switch, wherein, the access unit judges whether the access request is concerned with electronic commerce and accesses the area used for electronic commerce if the access is concerned with electronic commerce.

6. The memory card according to claim 5, wherein the area used for electronic commerce is provided within Tamper Resist Module.

7. A memory card receiving an access request to a memory unit sent from an external connecting device, and accessing the memory unit based on the access request by means of an access unit, comprising:

a physical switch comprised of hardware indicating the propriety of access to the memory unit; and an access limitation unit operable to limit accesses to the memory unit from the access unit based on the condition of the switch.

8. The memory card according to claim 7, wherein the switch is provided to an insert part in case where the insert part is arranged so as to be inserted to a specific slot of the external connecting device.

9. The memory card according to claim 7, wherein the switch is provided to a non-insert part in case where the insert part is arranged so as to be inserted to a specific slot of the external connecting device.

10. A memory card receiving an access request to a memory unit sent from an external connecting device, and accessing the memory unit based on the access request by means of an access unit, comprising:

a switch indicating the propriety of access to the memory unit; and an access limitation unit for storing in the memory unit a condition of the switch detected at a specific time, and prohibiting the access unit from accessing to the memory unit based on the change of the condition.

11. The memory card according to claim 10, wherein the access limitation unit asks a password to the external connecting device and then releases the prohibition of access based on the inputted password from the external connecting device and the pre-stored password inside.

* * * * *